United States Patent
Wilhelm et al.

(10) Patent No.: US 11,543,277 B2
(45) Date of Patent: Jan. 3, 2023

(54) SENSOR ARRANGEMENT FOR ARRANGEMENT ON A PROCESS INSTALLATION, AND METHOD FOR OPERATING THE SENSOR ARRANGEMENT AND PROCESS INSTALLATION

(71) Applicant: Endress+Hauser Flowtec AG, Reinach (CH)

(72) Inventors: Thomas Wilhelm, Chemnitz (DE); Wolfgang Drahm, Erding (DE); Alfred Rieder, Landshut (DE); Peter Klöfer, Steinen (DE); Thomas Moore, Jena-Drackendorf (DE)

(73) Assignee: Endress+Hauser Flowtec AG, Reinach (CH)

( * ) Notice: Subject to any disclaimer, the term of this patent is extended or adjusted under 35 U.S.C. 154(b) by 298 days.

(21) Appl. No.: 16/768,774

(22) PCT Filed: Nov. 13, 2018

(86) PCT No.: PCT/EP2018/081051
§ 371 (c)(1),
(2) Date: Jun. 1, 2020

(87) PCT Pub. No.: WO2019/105731
PCT Pub. Date: Jun. 6, 2019

(65) Prior Publication Data
US 2020/0319009 A1    Oct. 8, 2020

(30) Foreign Application Priority Data

Dec. 1, 2017   (DE) .................... 10 2017 128 566.0

(51) Int. Cl.
*G01F 15/00*   (2006.01)
*G01F 15/06*   (2022.01)
(Continued)

(52) U.S. Cl.
CPC .......... *G01F 15/003* (2013.01); *G01F 15/063* (2013.01); *G01F 23/22* (2013.01);
(Continued)

(58) Field of Classification Search
CPC .... G01F 15/003; G01F 23/804; G01F 15/063; G01F 23/22; G08C 17/02; G08C 19/00
See application file for complete search history.

(56) References Cited

U.S. PATENT DOCUMENTS 4,667,364 A * 5/1987 Meili ...................... A47L 11/34
                                                    15/353
4,675,935 A * 6/1987 Kasper ................ A47L 11/4011
                                                    15/319
(Continued)

FOREIGN PATENT DOCUMENTS

CN    101344783 A    1/2009
CN    104515544 A    4/2015
(Continued)

OTHER PUBLICATIONS

Daniel-Ioan Curiac et al.: "Redundancy and its Applications in Wireless Sensor Networks: a: Survey", WSEAS Transactions on Coomputers (Issue4, vol. 8, Apr. 2009) Apr. 1, 2009 (Apr. 1, 2009), Seiten 705-714, XXP055570627.

(Continued)

*Primary Examiner* — Sisay Yacob
(74) *Attorney, Agent, or Firm* — Mark A. Logan; Endress+Hauser (USA) Holding, Inc.

(57) ABSTRACT

Disclosed is a sensor arrangement on a process installation comprising at least two sensor tiles, wherein each sensor tile comprises a support and a plurality of sensors arranged on the support for determining a physical or chemical variable of a measuring medium, a process characteristic of the measuring medium, and/or a state of the process installation.

(Continued)

A first sensor tile comprises a control unit having a transmit and receive module for data exchange with a control unit of a second sensor tile. The first control unit of the first sensor tile and/or a second control unit allocated to the sensor arrangement is designed to weight the values determined by each sensor tile. Weighting may be a function of the measured value variations of the sensor tile, the position of the sensor tile in the process installation, and/or the function of the sensor tile.

20 Claims, 1 Drawing Sheet

(51) Int. Cl.
| | | |
|---|---|---|
| | *G01F 23/00* | (2022.01) |
| | *G01F 23/22* | (2006.01) |
| | *G01F 15/063* | (2022.01) |
| | *G01F 23/80* | (2022.01) |
| | G08C 17/02 | (2006.01) |
| | G08C 19/00 | (2006.01) |

(52) U.S. Cl.
CPC ........... *G01F 23/804* (2022.01); *G08C 17/02* (2013.01); *G08C 19/00* (2013.01)

(56) References Cited

U.S. PATENT DOCUMENTS

| | | | | |
|---|---|---|---|---|
| 5,435,035 | A * | 7/1995 | Fujimoto | A47L 11/4005 |
| | | | | 15/49.1 |
| 7,269,877 | B2 * | 9/2007 | Tondra | A47L 9/2889 |
| | | | | 15/319 |
| 8,584,294 | B2 * | 11/2013 | Loring | A47L 11/4038 |
| | | | | 15/49.1 |
| 2003/0024316 | A1 * | 2/2003 | Han | G01N 29/28 |
| | | | | 73/629 |
| 2005/0254185 | A1 * | 11/2005 | Cunningham | A47L 9/2842 |
| | | | | 361/23 |
| 2007/0186369 | A1 * | 8/2007 | Field | A47L 11/302 |
| | | | | 15/320 |
| 2008/0163692 | A1 * | 7/2008 | Huang | G01K 1/143 |
| | | | | 374/E1.019 |
| 2008/0163700 | A1 * | 7/2008 | Huang | G01B 17/025 |
| | | | | 73/861.25 |
| 2012/0097201 | A1 * | 4/2012 | Field | A61L 2/186 |
| | | | | 134/58 R |
| 2012/0271645 | A1 * | 10/2012 | Dain | G06Q 10/00 |
| | | | | 705/1.1 |
| 2015/0045990 | A1 * | 2/2015 | Shih | A47L 11/4061 |
| | | | | 701/2 |
| 2016/0195577 | A1 * | 7/2016 | Osaka | G01R 23/16 |
| | | | | 204/407 |

FOREIGN PATENT DOCUMENTS

| | | |
|---|---|---|
| CN | 106404846 A | 2/2017 |
| CN | 107077178 A | 8/2017 |
| CN | 107209043 A | 9/2017 |
| DE | 10143517 A1 | 3/2003 |
| DE | 102005054495 A1 | 5/2007 |
| DE | 102006030895 A1 | 1/2008 |
| DE | 102007007812 A1 | 8/2008 |
| DE | 102012104025 A1 | 11/2013 |
| DE | 102012112784 A1 | 6/2014 |

OTHER PUBLICATIONS

C. Fischione et al.: "Distributed cooperative processing and control over wireless sensor networks", International Wireless Communications and Mobile Computing Conference:IWCMC 2006; Jul. 3-6, 2006 Vancouver; British Columbia; Canada; Jan. 1, 2006 (Jan. 1, 2006), Seite 1311, XP055571709, 2 Penn Plaza, Suite 701 New York 10121-0701 USA. DOUI: 10.1145/1143549.1143813 ISBN: 978-59593-306-5.

Wikipedia: "Wireless Sensor Network", Wikipedia, Nov. 28, 2017 (Nov. 28, 2017), XP055569894.

Curiac, Daniel-Ion, Volosencu, Constantin, Pescaru, Dan, Jurca, Lucian and Doboli, Alexa, Redundancy and Its Applications in Wireless Sensor Networks: A Survey, WSEAS Transactions on Computers, ISSN: 1109-2750, Issue 4, vol. 8, Apr. 2009, 10 pp. (705-714).

Fischione, C., Graziosi, F., Johansson, K. H. and Santucci, F., Distributed Cooperative Processing and Control over Wireless Sensor Networks, IWCMC'06, Jul. 3-6, 2006, 6 pp.

Wikipedia, Wireless sensor network, https://en.wikipedia.org/w/index.php?title=Wireless_sensor_network&oldid=812577876, 12 pp. (last updated Nov. 18, 2017; last accessed Mar. 3, 2019).

* cited by examiner

SENSOR ARRANGEMENT FOR ARRANGEMENT ON A PROCESS INSTALLATION, AND METHOD FOR OPERATING THE SENSOR ARRANGEMENT AND PROCESS INSTALLATION

CROSS-REFERENCE TO RELATED APPLICATIONS

The present application is related to and claims the priority benefit of German Patent Application No. 10 2017 128 566.0, filed on Dec. 1, 2017 and International Patent Application No. PCT/EP2018/081051, filed on Nov. 13, 2018 the entire contents of which are incorporated herein by reference.

TECHNICAL FIELD

The present invention relates to a sensor arrangement according to the preamble of claim 1, and a method for its operation and a process installation.

BACKGROUND

Individual measuring devices, such as Coriolis measuring devices, which communicate with each other for the purpose of the signal adjustment of sensor parameters, are known. Such a form of communication between two measuring instruments is known from WO 2017/143576 A1, among others.

A distribution of functions of sensors in a process installation is known from DE 10 2007 024 006 A1. However, such sensors always communicate via a central evaluation unit.

SUMMARY

Based on such prior art, the present invention sets out to create a sensor arrangement with sensor assemblies, so-called "sensor tiles," which communicate with each other, wherein the current state of an assembly and its position in a process installation is also taken into account in order to obtain overall information.

The present invention achieves this object by a sensor arrangement having the features of claim 1.

In contrast to the aforementioned prior art, a sensor arrangement according to the invention for arrangement on a process installation with a plurality of measuring points comprises a plurality of sensor tiles.

A sensor tile within the meaning of the invention is to be understood as a support which can be arranged locally on the process installation and which has a plurality of sensors arranged on the support which serve to determine physical or chemical variables of a measuring medium and/or a process characteristic of a measuring medium found in the process installation and/or a state of the process installation.

A physical or chemical variable can be, for example, the pH value, the thermal conductivity, the sound conductivity, the density, the viscosity, the substance amount fraction of one or more components of the measuring medium and the like.

A process characteristic of a measuring medium in the process installation can be temperature, pressure, flow velocity, volume and/or mass flow rate and the like.

A state of a process installation can mean, for example, filled, partially filled or emptied. Further states include, for example, whether or not the medium is in motion, for example by using a mixing device, and can be determined by vibrations, among other things. Moreover, states regarding whether the process installation is working within the specification during processing, for example vibrations, pressure shocks or the like occurring in certain areas, can be detected by sensors.

Simple low-cost sensors, for example, inclination and/or oscillation sensors, particularly based on a gyro sensor or gyroscope, temperature sensors and/or acoustic sensors, in particular sound sensors, along with air humidity sensors, proximity sensors and/or acceleration sensors, are particularly preferred as sensors. Physical/chemical sensors, for example optochemical sensors or electrochemical sensors, particularly when using very inexpensive electrodes, such as stainless steel or graphite electrodes, can also be used for the sensor arrangement. Other low-cost sensors include optical sensors, such as turbidity sensors. Thermal flow sensors can also be manufactured very cost-effectively in MEMS design. From DE 10 2012 102 979 A1, a variant of an electromagnetic flowmeter which can also be produced in a cost-effective manner is known.

Preferably, however, all sensors of the sensor tiles are designed as MEMS components.

A first sensor tile of the aforementioned sensor tiles comprises a first control and/or evaluation unit having at least one transmit and receive module for data exchange with a first control and/or evaluation unit of a second sensor tile. Further components of the control and/or evaluation unit can be, for example, a computing unit, in particular a CPU, and a data memory.

According to the invention, data is exchanged between the first and second sensor tile, but preferably between all sensor tiles of the sensor arrangement.

The first control and/or evaluation unit of the first sensor tile and/or a second control and/or evaluation unit allocated to the sensor arrangement is designed, that is formed, to determine the physical or chemical variable of the measuring medium and/or the process characteristic of the measuring medium found in the process installation.

During the determination, among other things, there is a weighting of the values determined by each sensor tile.

The weighting of the values, that is, the measured values or the physical and/or chemical variable of the measuring medium calculated from them and/or the process characteristic and/or the state of the process installation, can be carried out as a function of a) the measured value variations of at least one sensor of a sensor tile;

b) the position of the sensor tile in the process installation and/or c) the function of the sensor tile.

Among other things, outliers can be disregarded in the measured value variations. If a sensor is subject to high measured value variations, the values of such sensor tend to have a low weighting.

An additional factor of weighting is the position of the sensor tile in the process installation. For example, sensor tiles in the first and last fifths of the process installation, that is, values from sensor tiles arranged on the inlet or outlet side, can have a higher weighting. In the case of mixed phases in a container or partially filled containers, the weighting of the sensors can be particularly high in the area of the phase boundary or phase boundaries, while the weighting can be considerably lower, for example, at the level of a pure liquid or gas phase.

A third factor of weighting is the function of the sensor tile. The sensors of the sensor tile are continuously measuring sensors, which are already adjusted to the process states. The sensor tiles, on the other hand, which are temporarily switched on for measurement are usually subject to a certain inaccuracy until they deliver stable measured values. As a result, the function of the sensor tile, continuously measuring or temporarily switched off, is included in the weighting.

The weighting is preferably adaptive. In the case of the failure or increasing aging of one or more sensors, the weighting is adjusted and the determined values of the sensor tile are included in the calculation with a lower weight because they are more prone to errors.

Based on the communication between the sensors and the adjustment of the measurement data with different weighting, a swarm intelligence of the sensor arrangement can develop, which for example continues to function even if a central control and/or evaluation unit fails.

Other advantageous embodiments of the invention are the subject matter of the dependent claims.

It is advantageous if each of the sensor tiles has a control and/or evaluation unit having at least one transmit and receive module for data exchange with the control and/or evaluation units of the other sensor tiles of the sensor arrangement. This ensures the communication of all sensor tiles among each other.

A plurality of different sensors can be provided on the sensor tile which are used to determine different physical or chemical variables of the measuring medium and/or different process characteristics of the measuring medium in the process installation. For example, a temperature sensor and an inclination sensor, which can also determine oscillation and thus viscosity, can be arranged on a sensor tile.

It is also possible and advantageous if a plurality of sensors of the same type are arranged one behind the other on a sensor tile in a sensor field in the flow direction or filling direction of the measuring medium. This allows a trend forecast for the subsequent measuring point in the process installation to be determined and/or a monitoring function of the sensor tile to be realized. The first sensor tile can advantageously have at least two operating states, wherein a first operating state serves for monitoring with regard to the change in the physical or chemical variable of the measuring medium and/or the process characteristic of the measuring medium found in the process installation and/or the state of the process installation and wherein a second operating state serves to determine the physical or chemical variable of the measuring medium and/or the process characteristic of the measuring medium found in the process installation and/or the state of the process installation.

Additionally or alternatively, the first sensor tile can have at least two operating states, wherein a first operating state serves to determine the physical or chemical variable of the measuring medium and/or the process characteristic of the measuring medium found in the process installation and/or the state of the process installation; and wherein a second operating state serves to regulate and/or control one or more actuating devices, for example a valve and/or a pump, of the process installation, wherein the regulation is effected by the control and/or evaluation unit of the first sensor tile.

In addition, individual or all sensor tiles can have other operating states in addition or as an alternative to the aforementioned operating states. Thus, a further operating state can be provided, in which the control and/or evaluation unit receives and processes the data from a plurality of sensor tiles. Such sensor tile can be located, for example, at a position in the process installation in which there are only slight measured value variations, such that the computing capacities of the control and/or evaluation unit of the sensor tile are optimally used.

In an additional operating state, the sensor tile can be set to stand-by, provided that no signal is received to switch over to measuring mode.

Switching between the aforementioned or other operating states can be done by assigning the function of a sensor tile within the sensor arrangement. The functions, for example an evaluation function of the measured values of a plurality of sensor tiles, a monitoring function of a change of state for starting up other sensors from stand-by mode and the like can be performed by the sensor arrangement itself. For example, the height of the filling level is detected and a sensor tile near the phase boundary is assigned with the monitoring function.

The assignment of a function to a sensor tile can be changed by the sensor arrangement during the operation of the process installation. Thus, when the filling level in a tank drops, the functions can vary as a function of the current level.

The control and/or evaluation unit of the first sensor tile can be used in a method according to the invention to calculate, on the basis of the measured values determined by its sensors, a predicted value for the physical or chemical variable of the measuring medium and/or the process characteristic of the measuring medium found in the process installation and/or the state of the process installation at a measuring point of the first sensor tile and, taking into account the geometry of the process installation, a predicted value for the physical or chemical variable of the measuring medium and/or the process characteristic of the measuring medium found in the process installation and/or the state of the process installation at a measuring point of a second sensor tile of the sensor arrangement, in particular of an adjacent sensor tile.

Such predicted value can be compared with the value determined by the second sensor tile and a weighting based on this comparison can be made and/or a result for the plausibility of the determined value can be output.

On the basis of the determined values of the physical or chemical variable of the measuring medium and/or the process characteristic of the measuring medium in the process installation and/or the state of the process installation, a total value of such variable and/or such process characteristic for the process installation and/or the state of the process installation can advantageously be output, wherein the measured values of the sensor tiles are individually weighted and taken into account in the calculation. A sensor tile can thereby transmit the total number of all values to a higher-level control and/or evaluation unit, that is, the second central control and/or evaluation unit, for evaluation and output of a state or a variable or process characteristic or the medium variable.

In addition to the total value, an uncertainty specification, which takes into account the state of the sensor arrangement, can be output. For example, the uncertainty specification can be increased with the number of failed sensors of one or more sensor tiles. The measurement functions can then still be guaranteed by determining secondary variables, but with a higher level of uncertainty.

The first sensor tile, in particular all sensor tiles of the sensor arrangement, can also have a data memory on which data records for the current sensor settings of adjacent sensor tiles are stored.

The assignment of functions of a particular sensor tile, as well as the weighting, can also be carried out based on the position of the sensor tile in the process installation as a function of the frequency of the change of state of the process installation at the position preferably when determining the filling level, the temperature of the measuring medium and/or the flow rate.

The measured values of sensors for determining different measured variables on a sensor tile can be weighted differently as a function of the position and the measured variable to be determined.

For example, the weighting of the measurement data of individual sensors can be higher or lower as a function of the changed operating state or function. If, for example, the sensor tile in a partially filled tank is below the phase boundary, a sensor for conductivity measurement can receive a higher weighting. However, if the tank is emptied further during production operation, such that the sensor tile is now above the phase boundary, the measurement data of a pressure measurement sensor can receive a higher weighting than before.

The weighting of the position of the sensor tile in the process installation can be carried out in particular as a function of the state of the process installation, for example the filling level and/or the temperature of the medium. At a phase boundary, for example, the weighting of the values of the sensor tiles can be significantly higher. This can also be shown by a temperature jump (phase transition from gaseous to liquid).

Advantageously, the sensor population or a subpopulation triggers control events, such as the control of a pump or a valve.

It is also possible that one or more sensor tiles override a control command from a higher-level control and/or evaluation unit. If, for example, an exceptional situation occurs, this enables the process installation to react faster to such exceptional situation.

In a preferred design variant, the weighting can be carried out individually according to the value to be determined (for example, temperature or pressure) and the position of the sensor tile to determine such individual variable. For example, it is possible that, for the determination of pressure, a first sensor tile is weighted especially high due to its position and, for the determination of temperature, a second sensor tile is weighted especially high due to its position, for example, a high weighting for the filling level at the interface, for pressure in the gas phase, for flow velocity near an inlet and/or outlet.

Thus, the weighting of the position depending on the parameter can be different and can also change in the process, for example upon a change to the filling level.

The population decides whether the higher-level control unit is overridden.

As a whole, the sensor arrangement according to the invention can be self-managed, for example, in the weighting and the allocation of functions.

A process installation with the aforementioned sensor arrangement is further in accordance with the invention.

Advantageous arrangements of the process installation comprise the subject matter of the subclaims.

In addition to the sensor arrangement, the process installation can contain one or more additional sensors, wherein data is exchanged between the sensor arrangement and such additional sensors, such that the measurement data of such sensors can also be taken into account, for example, in the evaluation, control and self-management of the sensor arrangement.

Furthermore, the process installation can have one or more actuating devices, wherein data regarding the state of the one or more actuating devices is exchanged with the sensor arrangement, such that the actuating devices can be controlled as a function of the exchanged data. For example, valves, pumps, heating elements, etc. are to be viewed as actuating devices. For example, if a pump runs hot, such pump provides a signal in this respect, which can be called up by the sensor arrangement, wherein the sensor arrangement reacts by controlling and/or regulating valves or the like through the sensor tiles.

In the following, the invention is explained in detail on the basis of an exemplary embodiment and with the help of the enclosed figure. The following are shown:

DETAILED DESCRIPTION

Figure 1:
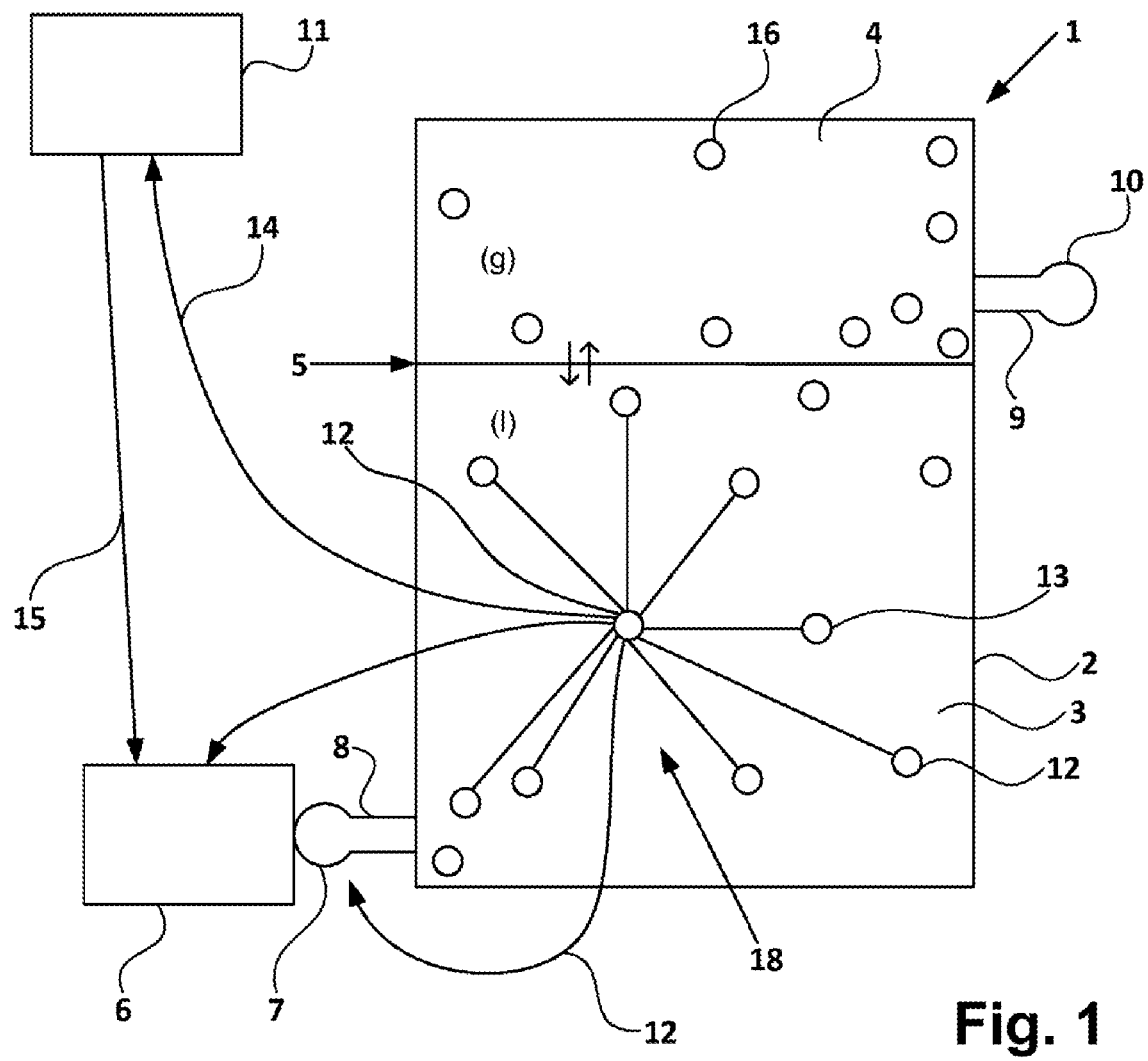
FIG. 1 shows a schematic structure of a process installation with a sensor arrangement comprising a plurality of sensor tiles.

FIG. 1 only shows an example of a process installation 1 in the form of a tank. The process installation is filled with a first liquid medium 3 and has a second gaseous medium 4, for example air or inert gas, in the upper area. Accordingly, a liquid-gas phase boundary 5 is shown. Furthermore, the process installation 1 has a pump 6 at the outlet 8 of the tank, which can be opened, partially opened or closed via a valve 7.

The process installation 1 also has an inlet 9, wherein the inflow of the first and/or second medium can also be controlled and/or regulated via a valve 10.

The control and/or regulation of the inflow, outflow, temperature, retention time and the like can be controlled by a higher-level control and/or evaluation unit 11, which is also referred to as the second control and/or evaluation unit in the following.

A sensor arrangement 18 is arranged along process installation 1 as a network of sensor tiles 12 with a plurality of sensors 101-107 for determining different characteristic values. These can comprise sensors of micro-electromechanics (M EMS sensors).

Preferred sensors 101-107 are, for example, inclination and/or oscillation sensors, particularly based on a gyro sensor or gyroscope, temperature sensors and/or acoustic sensors, in particular sound sensors, along with air humidity sensors, proximity sensors and/or acceleration sensors, are particularly preferred as sensors.

Physical/chemical sensors, for example optical-chemical sensors and/or electrochemical sensors, particularly when using very inexpensive electrodes, such as stainless steel or graphite electrodes, can be used for the sensor tile.

So-called "air-quality sensors" are also preferred sensors within the scope of the present invention.

The sensors 101-107 are arranged in a prefabricated pattern on a support of the sensor tile. Furthermore, transmit and/or receive modules can be arranged on the sensor tile.

The population arising from the support with a plurality of sensors 101-107 for the detection of at least three different physical and/or chemical variables is also referred to in the following as sensor tile 12.

Figure 2:
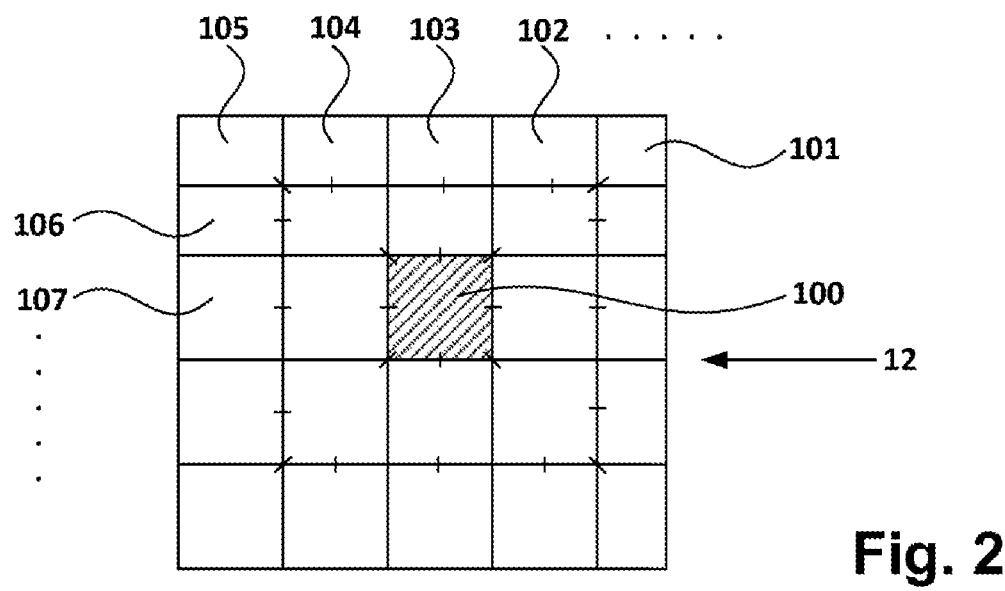
FIG. 2 shows a sensor tile.

Furthermore, a control and/or evaluation unit 100 can be arranged on the sensor tile 12, which will also be referred to as the first control and/or evaluation unit in the following. The sensors 101-107 can be connected to the first control and/or evaluation unit directly or via additional sensors of the sensor tile, as shown in FIG. 2, among others.

The plurality of sensor tiles 12, in particular a plurality of sensor tiles 12 with the same topological structure, are positioned at different locations along a pipeline and/or tank.

The measurement data of the majority of sensor tiles can be detected and managed in an overall acquisition system, for the example by the control and/or evaluation unit 11. Optionally, data consolidated by the subpopulation, particularly including weighted data, of the entire sensor arrangement can be forwarded from a sensor tile to the higher-level control and/or evaluation unit.

The overall acquisition system also allows a distribution of the sensor tiles and/or the individual sensors according to priority and weighting.

For example, depending on the position of the sensor tiles, a different weighting of the determined measured values can be carried out by the sensors of the respective sensor tile.

The data transmission between the sensor tiles and/or between a sensor tile 12 and the second control and/or evaluation unit can be wireless, for example by radio or by means of cable. A signal path 13 between two sensor tiles 12 and a signal path 14 between one sensor tile 12 and the second control and/or evaluation unit 11 is shown in FIG. 1.

The second control and/or evaluation unit 11 can communicate with the pump 6 or, if necessary, also with the valves 7 and 10 via one or more signal paths 15 to transmit control commands or to coordinate control events.

However, a single or multiple sensor tiles 12 can also communicate with the aforementioned components via a signal path 17.

Furthermore, the process installation can also have sensors, such as pressure sensor 16, which is not allocated to the sensor arrangement 18.

For example, sensor measurement data on the inlet side and the outlet side of a pipe system has a higher weighting than sensor measurement data in the middle of the tank.

The sensor tile can also preferably be an array, that is, a sequence of a plurality of sensors of the same type which, for example in the direction of flow, are arranged one behind the other on the support of the sensor tile 12, for example temperature sensors, which are arranged one behind the other in a predetermined direction in order to determine a local trend behavior, for example a rise in temperature.

This local trend behavior, for example a temperature jump, can be used to determine, for example, a medium change in a tank or a pipeline.

In addition, the measurement of the variance of the temperature by the temperature array with a known geometry of the process installation allows an estimation of the temperature development at a location downstream of the sensor. Typically, when a local temperature rise is measured in locally downstream installation sections, a temperature change occurs due to increased mixing.

Due to the array of temperature sensors, not only can a flow velocity be determined based on the time variance of the individual temperature sensors arranged one after the other on the sensor tile, for example at the inlet of a tank; rather, a temperature prognosis can also be determined, for example for the temperature development in the middle of the tank, taking into account the geometrical specifications.

By determining predicted measured values at a first measuring point by the sensors of the sensor tiles at a second, third and/or fourth measuring point, a plausibility check of the measured value at the first measuring point can be performed. If the measured value is outside a tolerance range for the predicted measured value, such measured value can be disregarded.

Alternatively or additionally, the function of the corresponding sensor tile can be modified.

Furthermore, a state value can be determined with regard to the operating state of the sensor tile which can be specific for individual measured variables and which can be taken into account for future assignments of functions and weightings along with maintenance decisions (for example, replacement of a sensor tile).

In the case of short-term measured value variation of a sensor of a sensor tile, so-called "outliers," a plausibility check can also be carried out by the other sensors of a sensor tile and/or the entire system, and the incorrect measured value can be disregarded when determining a physical and/or chemical variable of the measuring medium. If the measured value is again within the tolerance range during a subsequent measurement, it can be taken into account again when determining the physical and/or chemical variable.

If a measured value variation of a measured value within a time interval has not occurred, the measured values of such sensor are weighted more heavily when determining the physical and/or chemical variable and/or when determining predicted measured values of other sensors.

However, such forecast calculations are always subject to uncertainties, which are taken into account when weighting the measurement data of a sensor tile.

Furthermore, it is possible that individual sensors of a sensor tile, in particular individual sensors of an array, fail. Within the scope of the present invention, this does not necessarily lead to the failure of the sensor tile or to the non-consideration of the measured values of the sensor tile; rather, the weighting of the measured values is reduced in the case of one or more failed sensors.

As a result, the weighting of the sensor data and plausibility checks ensure that the population of all sensors in the sensor tiles agree on a predicted measured value at the measuring point and/or on a physical and/or chemical variable of the measuring medium.

In an additional aspect of the present invention, the weighting of the measured and predicted measured values results in a distribution of tasks within the overall system.

Thereby, depending on the type of sensor and the position of the sensor tile in the process installation, a single sensor takes on an additional function in addition to determining measurement data. This can be a monitoring function, for example.

If this sensor detects a significant change in the current measured values compared to previous measured values, sensors of additional sensor tiles and/or additional sensors of the same sensor tile can be connected.

This is energy-saving, and the susceptibility of the sensors to malfunction decreases. Therefore, the measurement performance of the entire sensor arrangement is highly variable and is set and managed by the measurement and evaluation unit as a function of the temporal development of the measurement data.

In addition, sensor tiles can be installed at strategic points of a process installation, for example at the inlet and/or outlet area of the process installation. These can control the inflow and/or outflow speed of the measuring medium from the process installation in interaction with actuating devices of the process installation, for example valves or the like. In the event of the detection of particularly hot or corrosive measuring medium, this means that, with appropriate measurement in the inlet area, for example, a zero flow rate can be set, and in the case of the tank, a filling speed of zero can be set by controlling the valve using the sensor measurement data of the sensor tile arranged at the inlet.

The distribution of functions and/or tasks of the individual sensors on a sensor tile or the sensor tiles among each other can vary; thus, it is possible that the control and/or evaluation unit assigns new tasks and/or functions to individual sensors. If a sensor has strongly fluctuating measured values and thus a low weighting, the monitoring function can be withdrawn from it and allocated to a new sensor.

In an additional aspect of the present invention, each individual sensor tile has a data memory and a transmit and receive unit. If a sensor and/or sensor tile is exchanged, a data transfer of the sensor settings occurs at the current point in time.

In the event of the replacement of a single sensor, it can take place through the transfer of data to the data memory of the sensor tile on which the sensor is arranged.

In the event of an exchange of an entire first sensor tile, data is transferred to the data memory of an adjacent second sensor tile. A third replacement sensor tile newly installed instead of the first sensor tile receives the sensor settings from the adjacent second sensor tile at the current point in time when the first sensor tile is in operation.

The transferred sensor settings can include, among other things, the additional tasks and functions of individual sensors or the entire sensor tile and the weighting of the sensor tile and the sensors arranged on it when measuring the physical and/or chemical variable of the measuring medium, along with the measuring range in which the sensors have measured. This simplifies the calibration and adjustment of the sensors to the process, and the sensors of the third sensor tile achieve their optimum measuring performance at an earlier point in time after installation.

In an additional aspect of the present invention, an overall state of the installation is determined by evaluating all measurement data; for example, the installation is in one of the following states:

"in the optimum operating state,"
"within a sufficient tolerance range,"
"outside the permissible tolerance range, but in the stable operating state," and
"in the destabilized operating state—emergency shutdown is initiated"

As a result, the sensor arrangement according to the invention constitutes a possibility for using measurement data occurring in the process, in order to achieve a continuous adaptation of the measurement, in the sense of a self-learning system.

The invention claimed is:

1. A sensor arrangement for arrangement on a process installation having a plurality of measuring points, the sensor arrangement comprising:
   a plurality of sensor tiles, each sensor tile including:
      a support that can be arranged locally on the process installation;
      a control and evaluation unit having a transmit and receive module for data exchange; and
      a plurality of sensors arranged on the support and embodied for determining physical or chemical variables of a measuring medium and/or a process characteristic of the measuring medium and/or a state of the process installation; and
   a control and evaluation unit,
   wherein each of the plurality of sensor tiles is configured for data exchange with another sensor tile of the plurality of sensor tiles,
   wherein data is exchanged between a first sensor tile and a second sensor tile of the plurality of sensor tiles,
   wherein the control and evaluation unit of the first sensor tile and the control and evaluation unit of the sensor arrangement are each designed to determine the physical or chemical variable of the measuring medium and/or the process characteristic of the measuring medium and/or the state of the process installation by weighting values determined by each sensor tile of the plurality of sensor tiles, and
   wherein the weighting is carried out as a function of measured value variations of at least one sensor of a sensor tile of the plurality of sensor tiles, a position of the respective sensor tile in the process installation, and/or a function of the respective sensor tile.

2. The sensor arrangement according to claim 1, wherein a plurality of different sensors are provided on each sensor tile, wherein the plurality of different sensors are used to determine different physical or chemical variables of the measuring medium and/or different process characteristics of the measuring medium found in the process installation and/or different state variables of the process installation.

3. The sensor arrangement according to claim 1, wherein a plurality of sensors of the same type are arranged one behind the other on a sensor tile in a sensor field in a flow direction or a filling direction of the measuring medium.

4. The sensor arrangement according to claim 1, wherein the first sensor tile has at least two operating states, wherein a first operating state serves for monitoring with regard to the change in the physical or chemical variable of the measuring medium and/or the process characteristic of the measuring medium found in the process installation and/or the state of the process installation and wherein a second operating state serves to determine the physical or chemical variable of the measuring medium and/or the process characteristic of the measuring medium found in the process installation and/or the state of the process installation.

5. The sensor arrangement according to claim 1, wherein the first sensor tile has at least two operating states, wherein a first operating state serves to determine the physical or chemical variable of the measuring medium and/or the process characteristic of the measuring medium found in the process installation and/or the state of the process installation and wherein a second operating state serves to regulate and/or control one or more actuating devices of the process installation, wherein the regulation and/or control is effected by the control and evaluation unit of the first sensor tile.

6. The sensor arrangement according to claim 4, wherein a switching of the operating states is effected by assigning a function of a sensor tile within the sensor arrangement.

7. The sensor arrangement according to claim 6, wherein the assignment of a function of a sensor tile can be changed by the sensor arrangement during the operation of the process installation.

8. The sensor arrangement according to claim 1, wherein the control and evaluation unit of the first sensor tile is configured to calculate, on the basis of the measured values determined by its sensors, a predicted value for the physical or chemical variable of the measuring medium and/or the process characteristic of the measuring medium and/or the state of the process installation at a measuring point of the first sensor tile and, taking into account a geometry of the process installation, a predicted value for the physical or chemical variable of the measuring medium and/or the process characteristic of the measuring medium found in the process installation and/or the state of the process installation at a measuring point of the second sensor tile of the sensor arrangement.

9. The sensor arrangement according to claim 8, wherein the control and evaluation unit of the first sensor tile is further configured to compare the predicted value with the value determined by the second sensor tile, to carry out a weighting on the basis of this comparison, and to output a result on the plausibility of the determined value.

10. The sensor arrangement according to claim 8, wherein on the basis of the determined values of the physical or chemical variable of the measuring medium and/or the process characteristic of the measuring medium found in the process installation and/or the state of the process installation, the control and evaluation unit of the first sensor tile is further configured to output a total value of such variable and/or such process characteristic for the process installation, wherein the measured values of the sensor tiles are individually weighted and taken into account in the calculation.

11. The sensor arrangement according to claim 10, wherein the control and evaluation unit of the first sensor tile is further configured to output an uncertainty specification which takes into account the state of the sensor arrangement.

12. The sensor arrangement according to claim 1, wherein the first sensor tile has a data memory on which data records for the current sensor settings of adjacent sensor tiles are stored.

13. The sensor arrangement according to claim 8, wherein the position of the sensor tile in the process installation is weighted as a function of the frequency of the change of state of the process installation at the position when determining the filling level, the temperature of the measuring medium and/or the flow rate.

14. The sensor arrangement according to claim 8, wherein the measured values of sensors for determining different measured variables on a sensor tile are weighted differently as a function of the position and the measured variable to be determined.

15. The sensor arrangement according to claim 8, wherein the control and evaluation unit of the first sensor tile is further configured to trigger control events for actuating devices, including for controlling a pump of the process installation and/or a valve of the process installation, based on the weighted value of a sensor tile or the weighted values of the plurality of sensor tiles.

16. The sensor arrangement according to claim 15, wherein control commands of the control and/or evaluation unit of the sensor arrangement are overridden on the basis of the weighted value of a sensor tile or the weighted values of the plurality of sensor tiles.

17. The sensor arrangement according to claim 8, wherein the control and evaluation unit of the first sensor tile is further configured to determine a state value with regard to the operating state of a single or a subpopulation of the sensor arrangement comprising a plurality of sensor tiles, wherein the state value is specific for individual measured variables and is taken into account for future assignments of functions and weightings along with maintenance decisions with regard to the replacement and/or repair of the sensor tile or the subpopulation of the sensor tiles.

18. A process installation, comprising:
  a sensor arrangement, including:
    a plurality of sensor tiles, each sensor tile including:
      a support which can be arranged locally on the process installation;
      a control and evaluation unit having a transmit and receive module for data exchange; and
      a plurality of sensors arranged on the support and embodied for determining physical or chemical variables of a measuring medium and/or a process characteristic of the measuring medium and/or a state of the process installation; and
    a control and evaluation unit,
    wherein each of the plurality of sensor tiles is configured for data exchange with another sensor tile of the plurality of sensor tiles,
    wherein data is exchanged between a first sensor tile and a second sensor tile of the plurality of sensor tiles,
    wherein the control and evaluation unit of the first sensor tile and the control and evaluation unit of the sensor arrangement are each designed to determine the physical or chemical variable of the measuring medium and/or the process characteristic of the measuring medium and/or the state of the process installation by weighting values determined by each sensor tile of the plurality of sensor tiles, and
    wherein the weighting is carried out as a function of measured value variations of at least one sensor of a sensor tile of the plurality of sensor tiles, a position of the respective sensor tile in the process installation, and/or a function of the sensor tile.

19. The process installation according to claim 18, wherein, in addition to the sensor arrangement, the process installation includes one or more additional sensors, wherein data is exchanged between the sensor arrangement and such additional sensors.

20. The process installation according to claim 19, wherein the process installation includes actuating devices, wherein data regarding the state of the actuating devices is exchanged with the sensor arrangement such that the actuating devices are controlled as a function of the exchanged data.

* * * * *